United States Patent [19]

Knudson et al.

[11] 4,159,613

[45] Jul. 3, 1979

[54] MOWER ATTACHMENT WITH DRIVE SUBASSEMBLY ADAPTED FOR DETACHABLE CONNECTION TO A TRACTOR

[75] Inventors: Henry T. Knudson, Grafton; Kenneth H. Klas, Port Washington, both of Wis.

[73] Assignee: Allis-Chalmers Corporation, Milwaukee, Wis.

[21] Appl. No.: 825,532

[22] Filed: Aug. 18, 1977

[51] Int. Cl.² .......................................... A01D 35/26
[52] U.S. Cl. .................................... 56/11.3; 56/11.6;
       56/15.3; 56/15.6; 56/16.2; 56/DIG. 22
[58] Field of Search ...................... 56/11.3, 11.6, 11.7,
       56/11.8, DIG. 22, 15.3, 15.6, 16.2, 15.9

[56] References Cited

U.S. PATENT DOCUMENTS

| | | | |
|---|---|---|---|
| 3,229,452 | 1/1966 | Hasenbank | 56/11.3 |
| 3,483,684 | 12/1969 | Price | 56/DIG. 22 |
| 3,706,186 | 12/1972 | Hurlburt et al. | 56/DIG. 22 |
| 3,795,094 | 3/1974 | Mollen et al. | 56/11.6 |

*Primary Examiner*—Jay N. Eskovitz
*Attorney, Agent, or Firm*—Charles L. Schwab

[57] ABSTRACT

The mower attachment includes a drive subassembly which is adapted to be detachably connected to the front axle of the tractor. Specifically, the drive subassembly is adapted to be connected to downwardly opening channel members rigidly secured to transverse, oscillating front axle member. The mower attachment also includes a mower subassembly which is connected to the drive subassembly by a draft link structure. The drive subassembly includes a clutch pulley rotatably mounted on a clutch pulley support bracket which is in turn pivotally connected to a frame part of the drive subassembly so that it may swing between clutching and declutching positions. The clutch pulley support bracket is connected to a clutch control lever on the tractor by a disconnectable clutch control linkage. The drive subassembly also includes an idler pulley disposed on an oblique axis forwardly of the clutch pulley. The clutch and idler pulleys lie in planes which are transverse to one another intersecting on a longitudinally extending line which passes through both pulleys (in at least one adjusted position of the clutch pulley support bracket). A drive belt cooperatively engages the idler and clutch pulleys as well as a drive pulley on a power take-off shaft from the tractor engine and a pulley on the mower subassembly. The clutch pulley is disposed between portions of the drive belt which extend rearwardly from the idler pulley thus permitting a compact arrangement of components in the drive assembly. The mower subassembly includes blades mounted on driven spindles which include pulleys at their upper ends. A second belt is disposed in driving relation to pulleys connected to the spindles. A braking mechanism is included in the mower subassembly and is connected to the clutch operating linkage at the drive subassembly by a flexible cable.

16 Claims, 6 Drawing Figures

MOWER ATTACHMENT WITH DRIVE SUBASSEMBLY ADAPTED FOR DETACHABLE CONNECTION TO A TRACTOR

BACKGROUND OF THE INVENTION

Heretofore, others have provided mower attachments which are detachably connected to the underside of a lawn and garden tractor. Such attachments are shown in U.S. Pat. Nos. 3,948,025, 3,503,189 and 3,508,386.

BRIEF DESCRIPTION OF THE INVENTION

A mower attachment is provided for a riding tractor of the type having a power unit with a power take-off shaft to which a drive pulley is connected. The tractor may include an operator's station with a clutch operating lever adjacent thereto which may be shifted from clutching to declutching positions. The mower attachment includes two major subassemblies; namely, a mower subassembly which includes at least one rotating blade secured to a vertical shaft or spindle and presenting a driven pulley on its upper end. The mower subassembly also includes a brake mechanism for stopping the blade when the power is disconnected from the drive pulley. The mower attachment also includes a drive subassembly which has a frame adapted for releasable mounting on the oscillating front axle of the tractor. A draft structure pivotally connects the mower subassembly to the drive subassembly so as to permit the latter to be raised and lowered between mowing and transport positions. The drive subassembly also includes a clutch pulley mounted on a pivoting clutch pulley support bracket which swings about an axis between clutching and declutching positions in response to movement imparted thereto by the clutch lever through a clutch control linkage. A flexible control element interconnects the brake mechanism with the clutch control linkage.

The front axle of the tractor may include a pair of laterally spaced, downwardly opening channels to which transversely spaced portions of the drive subassembly are releasably secured. The channels may be part of a wishbone structure of the front axle.

It is an object of the present invention to provide a mower attachment which includes all the drive and clutching components except the engine power take-off pulley and tractor mounted clutch lever.

It is a further object of this invention to provide a mower attachment meeting the foregoing objective wherein clutch and idler pulleys are mounted on a drive subassembly which is releasably mounted on and beneath the front axle of the tractor.

It is a further object of the invention to provide a brake mechanism on a mower subassembly of a mower attachment which is automatically actuated upon disconnecting power to the mower blades and wherein the brake mechanism is connected to a clutch operating element in a drive subassembly adapted for releasable mounting on a tractor.

BRIEF DESCRIPTION OF THE DRAWINGS

One embodiment of the invention is illustrated in the drawings in which.

DETAILED DESCRIPTION OF THE DRAWINGS

Figure 1:
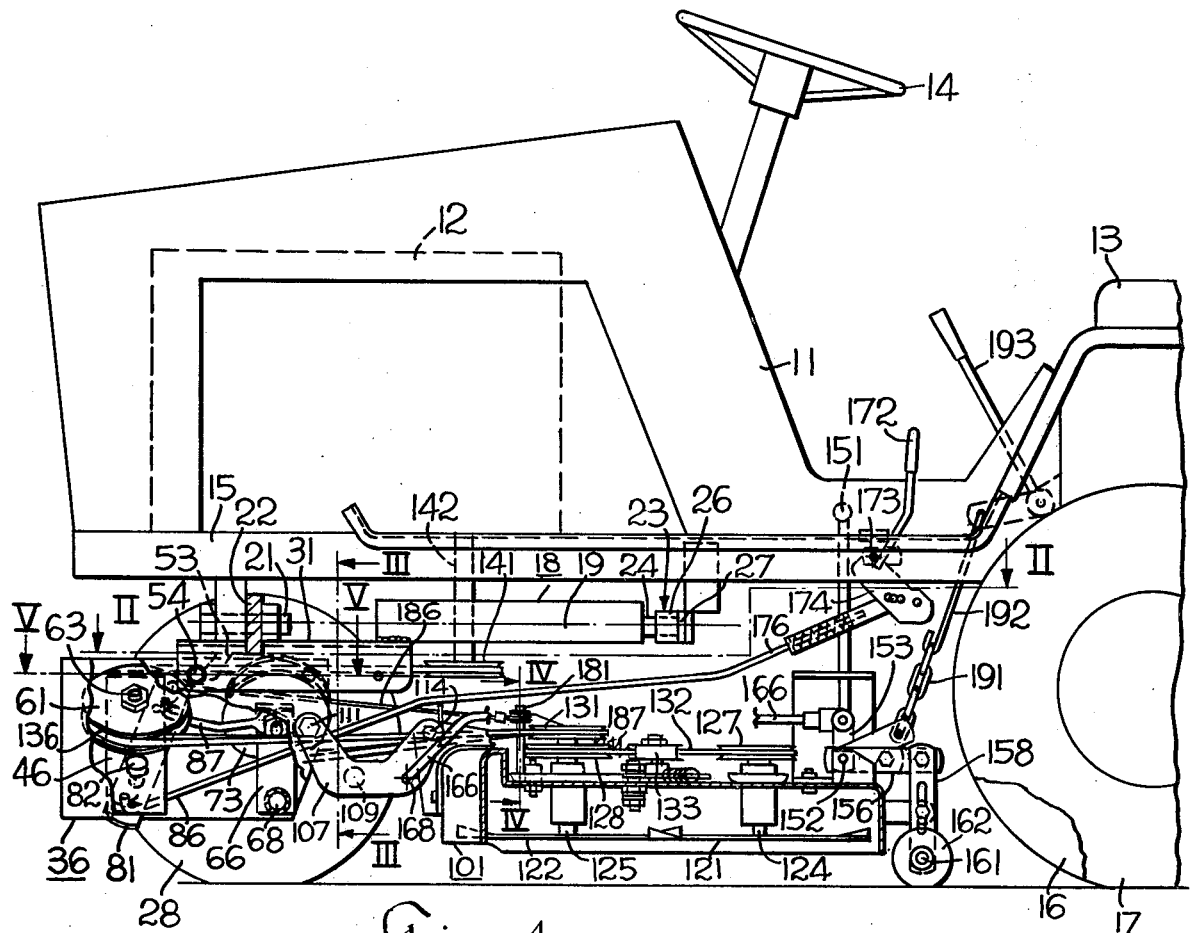
FIG. 1 is a side view of a tractor with a mower attachment incorporating the present invention.

In FIG. 1, there is illustrated a lawn and garden tractor 11 having a power unit in the form of an internal combustion engine 12, an operator's station 13 adjacent a steering wheel 14, a main frame 15 and a pair of rear drive wheels 16, 17 connected by a power train, not shown, to the engine 12. A transversely extending front axle 18 is pivotally connected on a longitudinal axis 19 to the front underside of the tractor main frame 15 by a pivot pin 21 which passes through a central portion of a transverse axle member 22 and by a rear pivot 23 which includes a cylindrical part 24 on the axle 18 and a socket part 26 which is rigidly secured as by welding to a bracket 27 depending from the main frame 15. A pair of steerable wheels 28 are mounted on opposite lateral ends of the axle 18.

Figure 6:
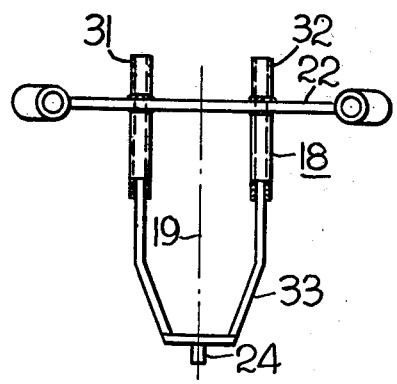
FIG. 6 is a top view of the front axle of the tractor shown in FIG. 1.

As shown in FIG. 6, which is a top view of the front axle 18, the axle 18 includes the transverse axle member 22 and a wishbone structure which comprises a pair of longitudinally extending, transversely spaced and downwardly opening channel members 31, 32 and a V-shaped part 33 which has its forwardly extending legs welded to the top of the rear ends of the channel members 31, 32 and includes the rear pivot part 24. The channel members 31, 32 extend below and are welded to transversely spaced portions of the transverse axle member 22 on opposite lateral sides of the longitudinal axis 19. The outer ends of the transverse axle part 22 have a pair of cylindrical bearing supports secured thereto as by welding in which the front wheel axles are pivotally mounted for steering movement. The channel members 31, 32 serve not only as a part of the wishbone structure of the axle 18, but also serve as supports for mounting the drive subassembly 36 of the mower attachment 37.

Referring to FIGS. 1, 2, 3 and 5, the mower attachment drive subassembly 36 includes a frame 41 which includes longitudinally extending vertical side walls 42, 43 interconnected by a front vertical transverse wall 44. As illustrated, walls 42, 43 and 44 are provided by a single plate member which is bent into a generally U-shaped configuration. An oblique longitudinally extending mounting plate 46 is rigidly secured as by welding at one of its ends to the lower part of wall 42 and at its other end to the top part of the wall 43. The drive subassembly is releasably secured to the axle 18 by mounting means which permit it to be quickly attached and detached. Each of the walls 42, 43 has a transversely open slot 53 formed therein which extends downwardly from the upper periphery of the walls 42, 43 and then forwardly so that the frame 41 may be hung from pins 54 extending through the slots 53 and through aligned holes in the flanges 47, 48, 49, 50 of the channels 31, 32. The pins 54 are held in place by appropriate spring clip fasteners 56. To complete the releasable fastening means for mounting the drive subassembly 36 on the front axle assembly 18, a pair of pins 58 are placed in aligned bores formed in the flanges of the channels 31, 32 and in the walls 42, 43. The pins 58 are held in position by appropriate spring clip fasteners 59.

The drive subassembly of the mower attachment 37 includes an idler pulley 61 mounted for rotation about an oblique axis 62 on a pivot bolt 63 extending through a longitudinally elongated slot 64 in the oblique mounting plate 46. A clutch pulley support bracket 66 includes an arm 67 to which a transversely extending pin 68 is welded. The pin 68 is supported by a cylindrical sleeve 69 welded to the vertical wall 43. The clutch pulley support bracket pivots about a transverse pivot axis 71 between a forwardly disposed clutching position and a rearwardly disposed declutching position. The free end of the clutch pulley support bracket 66 carries a pivot bolt 72 on which a clutch pulley 73 is mounted for rotation about an oblique axis 74. As viewed in FIG. 3, it will be noted that the planes 76, 77 through the idler pulley 61 and the clutch pulley 73, respectively, intersect on a line 78 which lies between the vertical side walls 42, 43 of the drive subassembly 36. It will also be noted that the line of intersection 78 passes through both of the pulleys 61, 73 when the clutch pulley and its support bracket are in the illustrated declutching position. The oblique mounting and reinforcing plate 46 pivotally supports a clutch operating lever 81 which is connected intermediate its opposite ends by a pivot bolt 82 for pivotal movement about an oblique pivot axis 83. The lower end of the lever 81 is pivotally connected to the front end of a clutch rod operating rod 86 and an upper portion of the lever 81 is pivotally connected to the rear of a link 87. The link 87 has a flattened forward end 88 pivotally connected to the pivot bolt 72. A nut 91 is threaded onto the threaded end of pivot bolt 72 thereby keeping the clutch pulley 73 bracket 66, and link 87 in an assembled condition.

Figure 2:
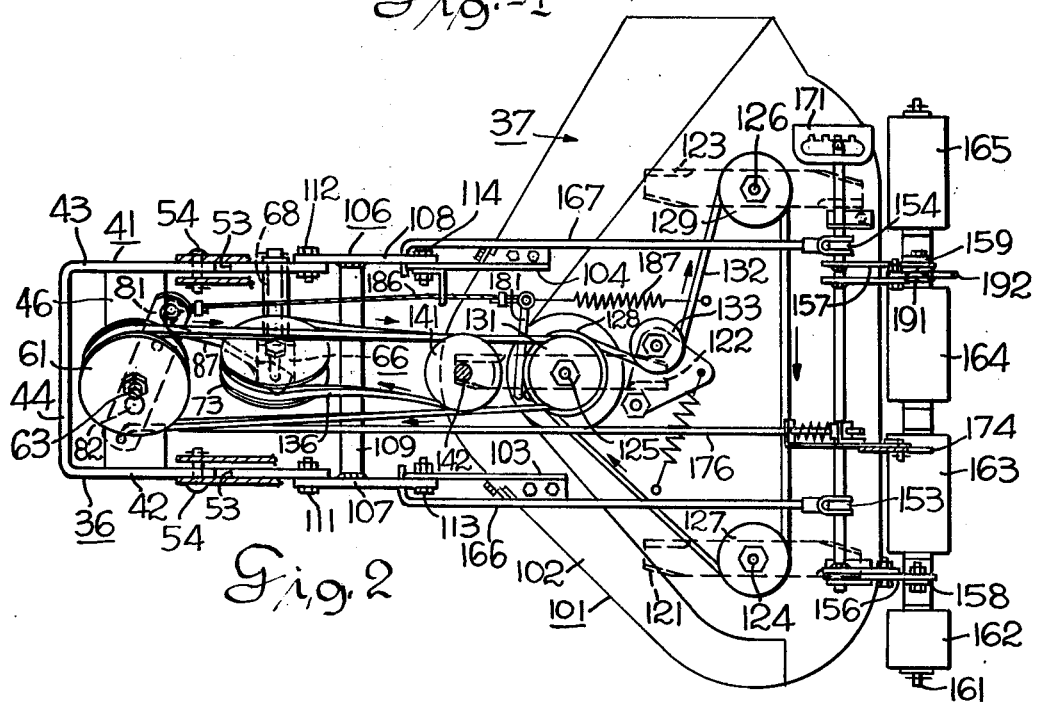
FIG. 2 is a section view taken along the line II—II in FIG. 1.
Figure 3:
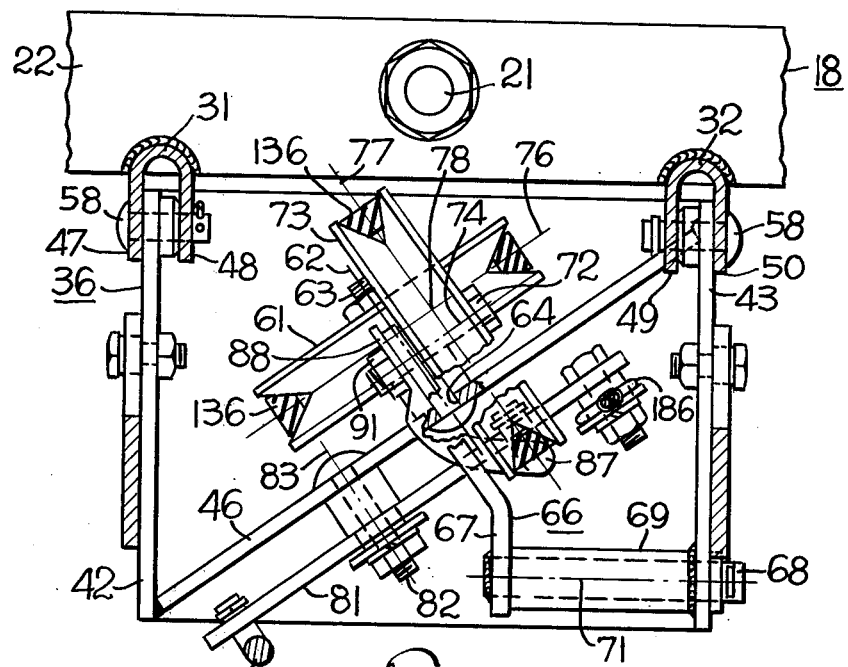
FIG. 3 is a section view taken along the line III—III in FIG. 1.

The mower attachment 37 includes mower subassembly 101 which includes a housing 102 to which mounting brackets 103, 104 are bolted. A draft structure 106 comprised of a pair of longitudinally extending links 107, 108 connected by a cylindrical transverse brace 109 is employed to pivotally connect the mower subassembly to the drive subassembly so as to not only provide the necessary draft connection, but also permit the mower subassembly to be raised and lowered by means which will hereinafter be described. The forward ends of the links 107, 108 are pivotally connected to the rear portion of the vertical walls 42, 43 of the drive subassembly frame 36 by pivot bolts 111, 112. The rear ends of the links 107, 108 are pivotally connected to the front portions of brackets 103, 104 respectively by pivot bolts 113, 114. Three cutting blades, 121, 122, 123 are secured to spindles 124, 125, 126 which carry pulleys 127, 128, 129 on the portion of the spindle extending above the housing 102. Spindle 125 also carries an additional power transfer pulley 131. A V-belt 132 engages the pulleys 127, 128, 129 and is maintained in a tightened condition by a spring biased idler pulley 133. Power is transmitted to the spindle 125 by belt means in the form of a V-belt 136 which cooperatively engages with the power transfer pulley 131. The V-belt 136 also cooperatively engages a drive pulley 141 secured to a power take-off shaft 142 extending vertically downwardly from the internal combustion engine 12. As shown in FIGS. 1 and 2, the drive V-belt 136 extends forwardly from the drive pulley 141 around the clutch pulley 73 thence rearwardly and around the power transfer pulley 131, thence forwardly around the idler pulley 61 and thence rearwardly to the drive pulley 141.

The mower subassembly 101 may be raised and lowered to vary the cutting height by manually operating an adjustment linkage which includes a hand lever 151 secured to a transverse shaft 152 which carries a pair of upstanding arms 153, 154 and a pair of rearwardly extending arms 156, 157. The rearwardly extending arms 156, 157 are connected to a pair of vertical links 158, 159 which carry a roller shaft 161 at the lower ends on which a plurality of rollers 162, 163, 164 and 165 are rotatably mounted. A pair of longitudinally extending rods 166, 167 have their rear ends pivotally connected to the upper ends of the arms 153, 154 and are pivotally connected at their forward ends to the links 107, 108 on a transverse axis 168 as viewed in FIG. 1. The manual lever 151 cooperates with a control quadrant 171 secured to the mower housing 102. Fore and aft movement of the control lever 151 will lower and raise the front and rear portions of the mower housing simultaneously.

A manually operated clutch control lever 172 is pivotally mounted on the tractor for rotation about a transverse pivot axis 173 and has a downwardly and rearwardly extending arm 174 to which the rear end of a longitudinally extending control link 176 is pivotally connected. The front end of the control link 176 is pivotally connected to the lower end of the obliquely disposed lever 81. When the clutch control lever 172 is moved forwardly at its upper end the link 176 of the clutch control linkage will be shifted rearwardly causing the lever 81 to be pivoted counterclockwise as viewed in FIG. 2 which in turn causes the link 87 to be moved forwardly causing the clutch pulley support bracket 66 to swing forwardly as viewed in FIGS. 1 and 2. This causes the drive belt 136 to be tightened thereby effecting a clutching of the drive from the engine to the mower, that is, drive belt 136 now causes the spindle 125 to be rotated and the pulley 128 drives the belt 132 causing the outer spindles 124, 126 to also be rotated.

Figure 4:
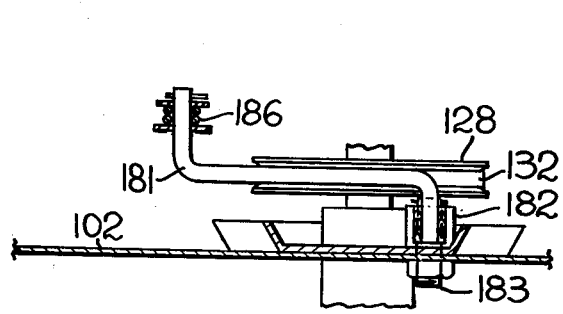
FIG. 4 is a section view taken along the line IV—IV in FIG. 1.
Figure 5:
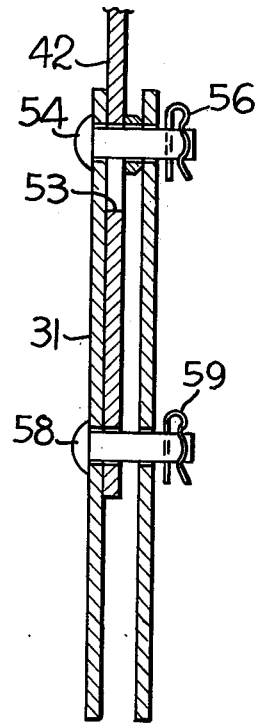
FIG. 5 is a section view taken along the line V—V in FIG. 1.

As shown in FIGS. 1 and 2, the clutch control linkage (link 176, lever 81, link 87, bracket 66) is in a declutching position and in this position an automatic brake on the mower subassembly is engaged to prevent rotation of the mower blades 121, 122, 123. Referring also to FIG. 4, the brake mechanism includes a brake member 181 which has a sleeve 182 at its lower end pivotally connected to the mower housing 102 by an upstanding pivot bolt 183 for rotation about a vertical pivot axis. The free end of the brake member 181 is connected to a flexible cable 186 which extends forwardly and is connected to the upper end of the lever 81. A tension spring 187 interconnects the free end of the lever 181 and the mower housing 102. As illustrated in FIGS. 1 and 2, the tension spring 187 is maintaining the lever 181 in engagement with the backside of the belt 132 providing a frictional brake to stop movement of the belt 132 which, in turn, stops rotation of the pulley 128 with which the belt 132 coacts. When the manually operated clutch control linkage connected to the clutch control lever 172 is moved to its clutching position, the clutch pulley 73 will be moved from its declutching position to a clutching position wherein the drive belt 136 is tensioned to cause transmission of power from the drive pulley 141 to the driven pulley 131 on the mower spindle 125. When the lever 81 is rotated counterclockwise in the clutching movement of the clutch control linkage, the brake control cable 186 will pull the lever 181 counterclockwise as viewed in FIG. 2 thereby taking it out of contact with the belt 132 and permitting the mower spindles to turn. When the operator declutches the mower drive, the brake 181, under the influence of tension spring 187, will automatically brake the mower spindles by frictional engagement with the drive belt 132.

In order to disconnect the mower attachment from the tractor, it is only necessary to remove the drive belt from the drive pulley 141, remove the pins 58 interconnecting the side walls 42, 43 of the drive subassembly frame 36 to the flanges of the downwardly opening channels 31, 32, disconnect a lift chain 191 from a lift rod 192 connected to a lift lever 193 on the tractor 11 and disconnect the control rod 176 from the clutch control lever 172. Now the mower assembly may be shifted forwardly (or the tractor rearwardly) so that the pins 54 will be disengaged from the L-shaped slots 53 on the drive subassembly frame 36.

From the foregoing description, it will be noted that all the drive and control mechanisms for the mower attachment except the drive pulley 141 on the engine PTO shaft 142 and the clutch operating lever 172 are part of the mower attachment. The assembled condition of the components of the mower attachment make it easy to ship, install, remove and store. The belt runs between the drive and mower subassemblies are long enough to minimize tracking and wear problems that might otherwise occur when operating the mower at different heights. The idler and clutch pulleys are disposed oblique to the horizon and in transverse angular relation to one another so that the clutch pulley is between the portions of the belt extending to and from the idler pulley. This arrangement of the clutch and idler pulleys permits the drive subassembly to be relatively compact. The drive subassembly includes the mower drive components and the brake actuating component and serves as a draft component for the mower subassembly. The downwardly opening channels 31, 32 to which the drive subassembly is releasably connected are integral parts of the wishbone structure of the oscillating front axle. After removal of the mower attachment from the tractor, the drive subassembly may be folded back over the top of the mower subassembly for compact storage or shipment. Since the cable for the brake mechanism need not be disconnected, the brake will not get out of adjustment due to removal of the mower attachment from the tractor. If it becomes necessary to adjust the longitudinal position of the idler pulley (by adjusting the position of the idler pulley pivot bolt 63 in the mounting slot 64) to compensate for excessive elongation of the drive belt 136, such idler pulley adjustment will not adversely affect the proper adjustment of the brake mechanism.

The embodiments of the invention in which an exclusive property or privilege is claimed are defined as follows:

1. A mower attachment for a riding tractor having a power unit, a power take-off shaft with a drive pulley and a mower clutch operating lever shiftable between clutching and declutching positions, said attachment comprising:
   a mower subassembly including
      a rotating cutting blade,
      drive means for said blade including a driven pulley, and
      a brake mechanism for stopping said blade,
   a drive subassembly including
      a frame adapted for releasable mounting on said tractor and pivotally connected in draft relation to said mower subassembly permitting the latter to be lowered and raised relative to said drive subassembly between mowing and transport positions,
      a mower clutch pulley support bracket mounted on said frame for swinging about a first axis, and
      a mower clutch pulley mounted on said bracket for rotation about a second axis spaced from said first axis, said clutch pulley being shifted between clutching and declutching positions upon pivoting of said bracket away from and toward said drive pulley on said tractor,
   belt means operable to drivingly connect said drive pulley to said driven and clutch pulleys when said frame is mounted on said tractor and said clutch pulley is in its clutching position,
   an operating linkage connected at one end to said clutch pulley support bracket and adapted at its other end for connection to said clutch operating lever, whereby movement of the latter between its clutching and declutching positions causes the clutch pulley to move between its clutching and declutching positions thereby connecting said blade to and disconnecting said blade from said power unit, and
   motion transmitting means operatively connecting said operating linkage to said brake mechanism whereby the latter is actuated to stop rotation of said blade when said clutch pulley is moved to its declutching position.

2. The attachment of claim 1 wherein said drive subassembly includes an idler pulley rotatably mounted on said frame on an axis spaced from the axis of said clutch pulley, said clutch and idler pulleys lying in intersecting planes, said belt means drivingly engaging said idler pulley.

3. The attachment of claim 2 wherein said planes intersect on a longitudinal line which passes through at least one of said clutch and idler pulleys.

4. The attachment of claim 3 wherein said longitudinal line passes through both of said clutch and idler pulleys.

5. The attachment of claim 2 wherein said idler pulley is disposed forwardly of said clutch pulley and said clutch pulley is disposed between the portions of said belt means extending to and from said idler pulley in the area of said drive subassembly.

6. The attachment of claim 1 wherein said frame includes a pair of laterally spaced vertical side walls, each of which has a transversely open slot extending downwardly from its upper periphery and then forwardly permitting releasable hooking engagement with a transversely extending hanger part on the tractor.

7. The attachment of claim 1 wherein said frame includes a pair of laterally spaced vertical side walls and a diagonal frame member extending between and having its laterally opposite ends rigidly secured to said side walls and wherein said operating linkage includes a motion transmitting lever pivotally mounted intermediate its ends on said diagonal frame member.

8. The attachment of claim 7 wherein said operating linkage includes a link interconnecting said motion transmitting lever with said clutch pulley support bracket at a point spaced from said first axis.

9. The attachment of claim 8 wherein said motion transmitting means includes a flexible pull element interconnecting said brake mechanism and said motion transmitting lever.

10. The attachment of claim 7 and further comprising an idler pulley rotatably mounted on said diagonal frame member, said belt means drivingly engaging said idler pulley.

11. The attachment of claim 1 wherein said drive subassembly includes an idler pulley rotatably mounted on said frame and wherein said belt means includes a belt drivingly engaging said idler pulley.

12. The attachment of claim 11 wherein said idler pulley is forwardly of said clutch pulley and is disposed on a third axis which is oblique to the horizon.

13. The attachment of claim 12 wherein said second axis is oblique to the horizon.

14. The attachment of claim 13 wherein said clutch pulley is disposed between portions of said belt extending to and from said idler pulley in the area of said drive subassembly.

15. In combination:
- a tractor having a main frame, a power unit, a pair of rear drive wheels, an oscillating front axle including
  - a transverse member having an intermediate portion pivotally connected to said tractor frame for oscillation about a longitudinal axis,
  - a wishbone structure including a pair of longitudinally extending, transversely spaced and downwardly open channel members rigidly secured to and extending below said transverse member and
- a part rigidly secured to the rear portions of said channel members and pivotally connected to said main frame for oscillating movement about said longitudinal axis,
- a mower attachment including a subassembly having a pair of laterally spaced walls extending upwardly into said downwardly open channels and
- releasable fastening means securing said walls to said channels.

16. The combination of claim 15 wherein said fastening means include downwardly and forwardly extending slots in said walls cooperatively engaging a pair of transverse pins extending between the flanges of said channel members.

* * * * *